US009851957B2

(12) United States Patent
Abadi et al.

(10) Patent No.: US 9,851,957 B2
(45) Date of Patent: Dec. 26, 2017

(54) IMPROVING APPLICATION CODE EXECUTION PERFORMANCE BY CONSOLIDATING ACCESSES TO SHARED RESOURCES

(71) Applicant: International Business Machines Corporation, Armonk, NY (US)

(72) Inventors: Aharon Abadi, Petach Tikva (IL); Andrei Kirshin, Haifa (IL); Gabi Zodik, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/957,632

(22) Filed: Dec. 3, 2015

(65) Prior Publication Data
US 2017/0161034 A1     Jun. 8, 2017

(51) Int. Cl.
G06F 9/45      (2006.01)
G06F 9/455    (2006.01)

(52) U.S. Cl.
CPC ........... *G06F 8/433* (2013.01); *G06F 8/47* (2013.01); *G06F 9/45516* (2013.01)

(58) Field of Classification Search
CPC .................... G06F 8/443–8/47; G06F 8/87
See application file for complete search history.

(56) References Cited

U.S. PATENT DOCUMENTS

| 5,179,702 A | * | 1/1993 | Spix | G06F 8/41 |
| | | | | 711/E12.006 |
| 5,197,130 A | * | 3/1993 | Chen | G06F 8/433 |
| | | | | 710/40 |
| 5,561,784 A | * | 10/1996 | Chen | G06F 8/433 |
| | | | | 711/157 |
| 5,835,777 A | * | 11/1998 | Staelin | G06F 8/61 |
| | | | | 717/175 |
| 5,875,337 A | * | 2/1999 | Miyano | G06F 8/45 |
| | | | | 717/151 |

(Continued)

OTHER PUBLICATIONS

Authors unknown, "Optimized Resource Loading Using Usage Analysis", An IP.com Prior Art Database Techincal Disculsoure, Nov. 27, 2014, IP.com No. IPCOM000239723D, pp. 1-3.*

*Primary Examiner* — Tuan Q. Dam
*Assistant Examiner* — Zheng Wei

(57) ABSTRACT

A computer implemented method of refactoring software code to optimize execution performance by consolidating shared resources accesses, comprising: receiving target code containing code entries accessing shared resource(s); automatically creating a dependency record for each shared resource. The dependency record describes dependencies among the code entries accessing shared data items in the shared resource(s); identifying, based on the dependency record, a resource access point for each shared resource(s), wherein the resource access point is located in an execution path of the target code to precede code entries which use the shared data item(s) and follows code entries which define the shared data item(s); automatically refactoring the target code to group together code entries which use the shared data item(s), wherein the group is placed following the resource access point to consolidate shared resource accesses of the code entries to the shared resource(s); and outputting the refactored target code.

16 Claims, 4 Drawing Sheets

(56) References Cited

U.S. PATENT DOCUMENTS

| | | | | |
|---|---|---|---|---|
| 6,117,187 | A * | 9/2000 | Staelin | G06F 8/61 717/169 |
| 6,415,433 | B1 * | 7/2002 | Callahan, II | G06F 8/433 717/124 |
| 6,629,312 | B1 * | 9/2003 | Gupta | G06F 8/47 703/20 |
| 6,978,459 | B1 * | 12/2005 | Dennis | G06F 9/52 718/100 |
| 7,873,441 | B2 * | 1/2011 | Synesiou | G06Q 10/00 340/870.01 |
| 7,962,900 | B2 * | 6/2011 | Barraclough | G06F 8/52 717/106 |
| 8,037,466 | B2 * | 10/2011 | Guo | G06F 8/4442 711/168 |
| 8,219,633 | B2 * | 7/2012 | Fainberg | G06F 17/30902 709/200 |
| 8,346,784 | B1 * | 1/2013 | Potekhin | G06F 17/30861 707/602 |
| 8,453,120 | B2 * | 5/2013 | Ceze | G06F 9/467 714/36 |
| 8,495,171 | B1 * | 7/2013 | Potekhin | G06F 17/30899 709/217 |
| 8,533,699 | B2 * | 9/2013 | Moir | G06F 9/467 717/151 |
| 8,694,997 | B2 * | 4/2014 | Ceze | G06F 9/463 711/147 |
| 8,713,100 | B1 * | 4/2014 | Hamm | G06F 17/30899 709/203 |
| 8,739,163 | B2 * | 5/2014 | Ceze | G06F 9/52 711/147 |
| 8,745,606 | B2 * | 6/2014 | Guo | G06F 8/433 717/156 |
| 9,280,796 | B2 * | 3/2016 | Synesiou | G06Q 10/00 |
| 2002/0073235 | A1 * | 6/2002 | Chen | G06F 17/30905 709/246 |
| 2004/0010592 | A1 * | 1/2004 | Carver | H04L 12/5695 709/226 |
| 2006/0277532 | A1 * | 12/2006 | Barraclough | G06F 8/52 717/137 |
| 2007/0061810 | A1 * | 3/2007 | Mehaffy | G06F 9/52 718/104 |
| 2008/0163181 | A1 * | 7/2008 | Guo | G06F 8/4442 717/143 |
| 2008/0172670 | A1 * | 7/2008 | Corrigan | G06F 9/526 718/104 |
| 2008/0244512 | A1 * | 10/2008 | Guo | G06F 8/443 717/110 |
| 2009/0089765 | A1 * | 4/2009 | Guo | G06F 8/443 717/144 |
| 2009/0217145 | A1 * | 8/2009 | Watson | G06F 17/30905 715/202 |
| 2010/0023926 | A1 * | 1/2010 | Sugawara | G06F 8/75 717/120 |
| 2010/0122253 | A1 * | 5/2010 | McCart | G06F 8/458 718/100 |
| 2011/0066676 | A1 | 3/2011 | Kleyzit et al. | |
| 2011/0239196 | A1 * | 9/2011 | Ichard | G06F 11/3636 717/127 |
| 2012/0131591 | A1 * | 5/2012 | Moorthi | G06Q 10/06 718/104 |
| 2012/0254846 | A1 * | 10/2012 | Moir | G06F 9/467 717/152 |
| 2014/0289734 | A1 * | 9/2014 | Adams | G06F 9/45516 718/104 |
| 2014/0331117 | A1 * | 11/2014 | Liu | G06F 17/30902 715/234 |
| 2015/0067024 | A1 | 3/2015 | Nesbitt | |
| 2015/0121349 | A1 * | 4/2015 | Abadi | G06F 8/433 717/132 |
| 2016/0170727 | A1 * | 6/2016 | Mars | G06F 9/4552 717/148 |

\* cited by examiner

IMPROVING APPLICATION CODE EXECUTION PERFORMANCE BY CONSOLIDATING ACCESSES TO SHARED RESOURCES

FIELD AND BACKGROUND OF THE INVENTION

The present invention, in some embodiments thereof, relates to refactoring a target code to optimize the execution performance, and, more specifically, but not exclusively, to refactoring the target code to optimize the execution performance by consolidating shared resources accesses.

As technology advances and software intensive application become more abundant, software development is being done by a rapidly growing number of programmers who may have limited experience and may not be fully familiar with proper software development practices. Moreover, software development may involve multiple programmers each contributing to the joined software product and may be unaware of implementations and/or actions and more specifically of resource usage made by software developed by the other programmers.

Furthermore, software development may employ modern agile development practices such as, for example, adaptive software development (ASD), extreme programming (XP), scrum and/or scrumban software development methodologies using various tools such as, Rally, VersionOne, Jira, and/or Mingle and the likes. Such agile development practices may dictate evolution of the software product through incremental software development in which new software features, elements and/or entities are added over time. Moreover the agile development practices may encourage distributed software development of a software product in which multiple development teams contribute to a software base of the software product.

Additional software features, elements and/or entities from different teams and or over time may utilize shared resources, for example, network access, communication interfaces access, memory access, storage access and/or processing nodes used by the existing software features, elements and/or entities, however the newly added software may be unaware of this resources usage. This may result in poor resource utilization, especially when accessing the shared resources presents a performance penalty, for example, high access time, long communication session and/or computation load.

SUMMARY OF THE INVENTION

According to some embodiments of the present invention there are provided methods and systems for refactoring software code to optimize execution performance by consolidating shared resources accesses, comprising of:

Receiving a target code containing a plurality of code entries comprising instructions to access one or more of a plurality of shared resources. The one or more shared resources may be a member selected from a group consisting of: a memory resource address, a storage resource address, a communication resource address and a processing resource address, wherein said at least one shared resource is local or remote.

Automatically creating a dependency record for each of the one or more shared resources. The dependency record describes dependencies among at least some of the plurality of code entries accessing one or more shared data items in the one or more shared resources.

Identifying, based on the dependency record, a resource access point for each of the one or more shared resources. The resource access point is located in an execution path of the target code so as to:

Precede execution of at least some of the plurality of code entries which use the one or more shared data items.

Follow execution of defining code entries of the plurality of code entries which define the one or more shared data items. Defining the one or more shared data items code entries may include, for example, manipulating the one or more shared data items in the one or more shared resources, setting the one or more shared data item(s) in the one or more shared resources and/or retrieving the one or more shared data items from the one or more shared resources.

Automatically refactoring the target code to group together the at least some code entries which use the one or more shared data items. The group is placed following the resource access point to consolidate shared resource accesses of the at least some code entries to the one or more shared resources. The refactoring does not alter any functional characteristics of the target code.

Outputting the refactored target code.

Optionally, the dependency record is a dependency graph created through a static analysis of the target code.

Optionally, accesses to the one or more shared resources are consolidated for at least some of the defining code entries. The consolidated access is executed prior to the resource access point in the execution path.

Optionally, the target code is refactored to include one or more additional resource access points for the one or more shared resource to consolidate accesses to the one or more shared resource for one or more additional segments of the target code.

Optionally, the dependency record is enhanced by analyzing usage analytics of the target code. The usage analytics is collected from a plurality of users using the target code.

According to some embodiments of the present invention there is provided a system for refactoring software code to optimize execution performance by consolidating shared resources accesses. The system comprises an interface for communicating with a user, a program store storing a code and one or more processors coupled to the interface and to the program store for executing the stored code. the code comprising:

Code instructions to receive a target code containing a plurality of code entries comprising instructions to access one or more of a plurality of shared resources. The one or more shared resources may be a member selected from a group consisting of: a memory resource address, a storage resource address, a communication resource address and a processing resource address, wherein said at least one shared resource is local or remote.

Code instructions to create a dependency record for each of the one or more shared resources. The dependency record describes dependencies among at least some of the plurality of code entries accessing one or more shared data items in the one or more shared resources;

Code instructions to identify, based on the dependency record, a resource access point for each of the one or more shared resources. The resource access point is located in an execution path of the target code The resource access point is located in an execution path of the target code so as to:

Precede execution of at least some of the plurality of code entries which use the one or more shared data items.

Follow execution of defining code entries of the plurality of code entries which define the one or more shared data items. Defining the one or more shared data items code entries may include, for example, manipulating the one or more shared data items in the one or more shared resources, setting the one or more shared data item(s) in the one or more shared resources and/or retrieving the one or more shared data items from the one or more shared resources.

Code instructions to refactor the target code to group together at least some code entries which use the one or more shared data items. The group is placed following the resource access point to consolidate shared resource accesses of the at least some code entries to the one or more shared resources. The refactoring does not alter any functional characteristics of the target code.

Code instructions to output the refactored target code.

Optionally, the one or more processors are adapted for executing the following code instructions in the code stored:

Code instructions to consolidate shared resource accesses for at least some of the defining code entries. The consolidated access is executed prior to the resource access point in the execution path.

According to some embodiments of the present invention there is provided a computer program product for refactoring software code to optimize execution performance by consolidating shared resources accesses comprising a non-transitory computer readable storage medium and a plurality of program instructions executed by one or more processors from the non-transitory computer readable storage medium. The program instructions comprising:

First program instructions to receive a target code containing a plurality of code entries comprising instructions to access one or more of a plurality of shared resources.

Second program instructions to create a dependency record for each of the one or more shared resources. The dependency record describes dependencies among at least some of the plurality of code entries accessing one or more shared data items in the one or more shared resources.

Third program instructions to identify based on the dependency record, a resource access point for each of the one or more shared resources. The resource access point is located in an execution path of the target code so as to:

Precede execution of at least some of the plurality of code entries which use the one or more shared data items.

Follow execution of defining code entries of the plurality of code entries which define the one or more shared data items. Defining the one or more shared data items code entries may include, for example, manipulating the one or more shared data items in the one or more shared resources, setting the one or more shared data item(s) in the one or more shared resources and/or retrieving the one or more shared data items from the one or more shared resources.

Fourth program instructions to refactor the target code to group together at least some code entries which use the one or more shared data items. The group is placed following the resource access point to consolidate shared resource accesses of the at least some code entries to the one or more shared resources. The refactoring does not alter any functional characteristics of the target code Fifth program instructions to output the refactored target code.

Optionally, the dependency record is a dependency graph created through a static analysis of the target code.

Optionally, the one or more processors are adapted for executing the following code instructions in the code stored:

Code instructions to consolidate shared resource accesses for at least some of the defining code entries. The consolidated access is executed prior to the resource access point in the execution path.

Optionally, the computer program product includes sixth program instructions to consolidate shared resource accesses for at least some of the defining code entries. The consolidated access is executed prior to the resource access point in the execution path. The sixth program instructions are executed by the one or more processors from the non-transitory computer readable storage medium.

Optionally, the computer program product is a member selected from a group consisting of: an integrated development environment (IDE), an add-on to the IDE, a service as a software (SAAS), a cloud service and a tool available through a session with a remote server.

Optionally, the dependency record is enhanced by analyzing usage analytics of the target code. The usage analytics is collected from a plurality of users using the target code.

Optionally, the fourth program instructions refactors the target code to include at least one additional resource access point for the one or more shared resources to consolidate accesses to the one or more shared resources for one or more additional segments of the target code.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
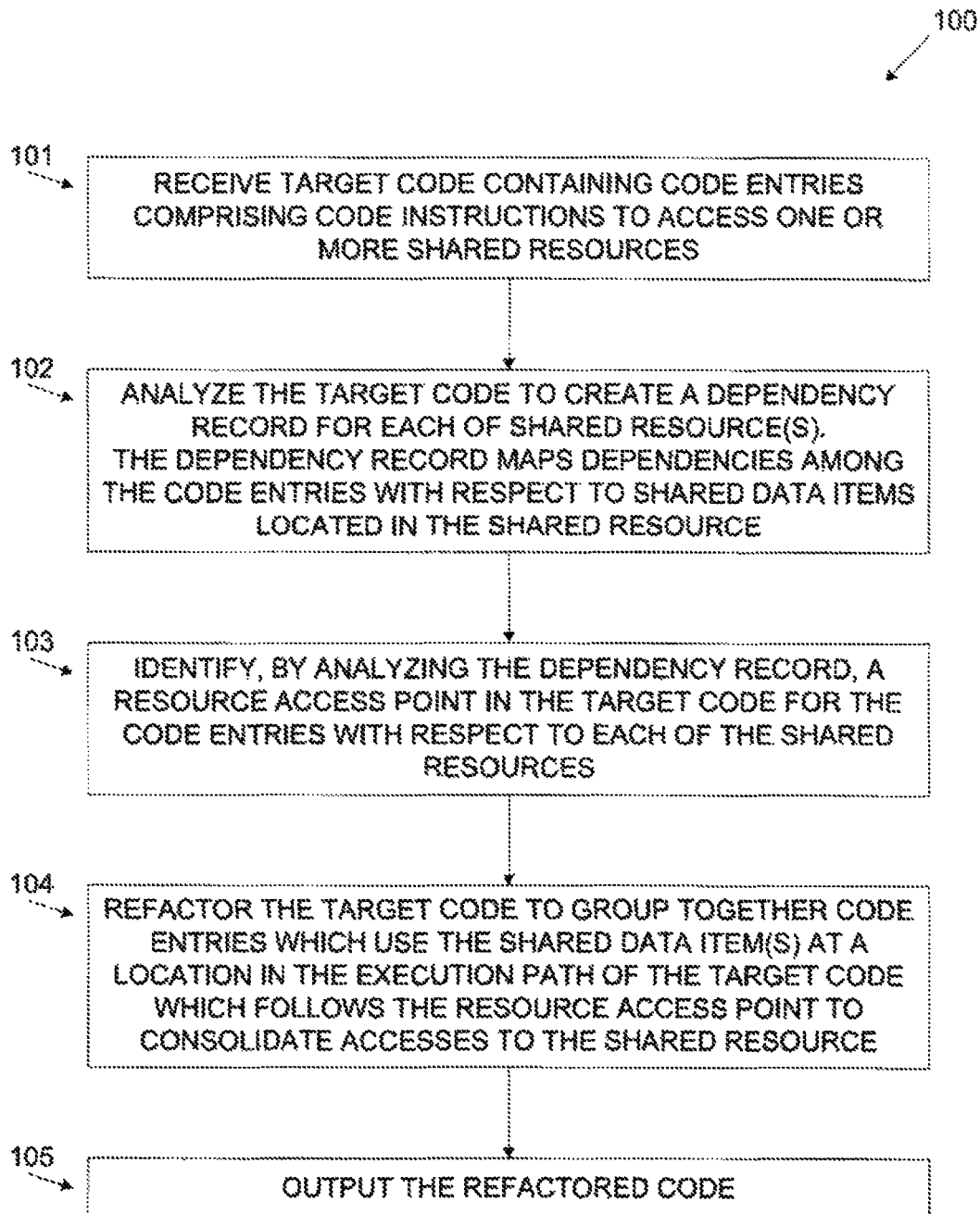
FIG. 1 is a flowchart of an exemplary process for refactoring target code to optimize accesses to shared resource(s), according to some embodiments of the present invention.

The present invention, in some embodiments thereof, relates to refactoring a target code to optimize the execution performance, and, more specifically, but not exclusively, to refactoring the target code to optimize the execution performance by consolidating shared resources accesses.

According to some embodiments of the present invention, there are provided systems and methods for optimizing execution performance of a target software code by refactoring the target code to consolidate multiple shared resource(s) accesses to reduce the number of shared resource(s) accesses. Consolidation of the multiple shared resource(s) accesses is done without breaking an execution path of the target code and/or affecting any functional properties of the target code.

The term shared resource(s) access(es) relates to, for example, code instructions, function calls and/or system calls performed to fetch, read and/or write of shared data item(s) available from one or more shared resources addresses.

Accessing the one or more shared resources, for example, a memory address, a storage address, a network address, a graphic processing unit (GPU) address, a single instruction multiple data (SIMD) processor address and/or an address of a remote resource available over the network may present a performance penalty, for example, long access time, extended session setup and/or teardown and/or high computation load. Reducing the number of shared resources accesses and/or sessions may significantly improve the execution of the target code, for example, remove bottlenecks where the shared resource(s) access(es) block the execution path, reduce computation load resulting from multiple instances for setting up and/or tearing down the session and/or avoid extended session setup and/or teardown time.

The target code, for example, code, abstract syntax tree (AST), code abstraction, code extensible markup language (XML) representation, JavaScript code, C code, C++ code, C# code, Objective C code, swift code, Java android code and/or any software code abstraction and/or representation technique is received from one or more users (programmers) using a development platform, for example, an integrated development environment (IDE) presenting a graphical user interface (GUI) and the likes. The IDE may include a code refactoring software tool which performs the refactoring of the target code to optimize the execution performance of the target code. The code refactoring software tool may be integrated in the IDE, provided as an add-on module and/or executed as a standalone program. The IDE and/or the code refactoring software tool may be utilized through a local application executed on a local development machine, for example, a computer, a laptop, a tablet and/or a work station. Optionally, the IDE and/or the code refactoring software tool may be available to the one or more users from a remote location, for example, a SAAS, a cloud service, a web browser session and/or an application instance executed locally from a remote server.

The received target code is analyzed using, for example, a static analysis to identify a plurality of relationships and/or dependencies between one or more shared data items, for example, variables, objects and/or data items which are available from the shared resource(s) and shared between code entries in the target code. The analysis process generates dependency record, for example, a dependency graph which maps the shared data items dependencies among the code entries along the execution path of the target code for each of the shared resources. Based on the generated dependency record, a resource access point is identified for each of the shared resource(s). The resource access point is located in the execution path of the target code where the resource access point follows one or more code entries which define one or more of the shared data items and precedes one or more code entries of the target code which use the one or more shared data items. The code entries which define the one or more shared data items may, for example, write, set, fetch and/or retrieve the shared data item(s). The one or more code entries of the target code which use the shared data item(s) may, for example, use, read, convey and/or display the shared data item(s). This means that the resource access point is located in the target code execution path to allow all shared data item(s) to be defined with respect to the shared resource(s) and available for any of the code entries which use the shared data item(s). After the resource access point is identified, at least some of the code entries which use the shared data item(s) may be placed together at a allocation in the target code which follows the resource access point in the execution path of the target code to consolidate the shared resources accesses to a single access and/or session. Additional one or more resource access points may be identified where each resource access point may relate to a segment of the execution path of the target code.

Optionally, one or more of the code entries which define the shared data item(s) are extracted from their original location in the target code execution path and placed at a location in the target code which precedes the resource access point in order to consolidate their access to the shared resource without altering the functional characteristics and/or the execution path of the target code.

Optionally, the refactoring process may be repeated for one or more segments of the target code. Additional one or more resource access point may be identified locally each corresponding to a segment of the target code to consolidate accesses to the hared resource(s) performed by code entries which located in close execution proximity.

Optionally, the dependency record is enhanced by analyzing usage analytics of the target code which may be collected from a plurality of users using the target code.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for refactoring target code to optimize accesses to shared resource(s), according to some embodiments of the present invention.

As shown at 101, a process 100 for refactoring a target code to optimize accesses to shared resource(s) starts with receiving a target software code example, code, AST, code abstraction, code XML representation, JavaScript code, C code, C++ code, C# code, Objective C code, swift code, Java android code and/or any software code abstraction and/or representation technique. The target code may include a plurality of code entries utilizing accesses, for example, code instructions and/or function calls to one or more shared resource(s), for example, a memory, a storage device, a network, a remote resource and/or a processing resource such as, a network, a GPU, a SIMD processor, a remote resource available over the network and the likes. Access, session, session setup and/or session teardown of one or more of the shared resources may involve performance penalty on execution of the target code in the form of, for example, long access time, extended session time, extended setup time, extended teardown time and/or high processing load. The target code may be received from one or more users (programmers) using a development platform, for example, an IDE presenting a UI and the likes. The UI may be implemented through a plurality of human-machine interfaces, for example, text interface, GUI and/or audio interface.

As shown at 102, the target code is analyzed to create a dependency record, using for example, a static code analysis creating a dependency graph. The dependency record maps dependencies and/or relationships among the plurality of code entries with respect to one or more shared data items available from one or more shared resources which are shared by at least two of the plurality of code entries. The dependency record describes the dependencies and/or relationships among code entries which use one or more of the shared data items and defining code entries which define the one or more shared data items. The dependency record maps the dependencies and/or relationships with respect to the execution path of the target code. The one or more shared data items may include, for example, variables, data and/or objects. The code entries which use the shared data item(s) may use the shared data items for one or more purposes, for example, processing, display, convey, transfer to another location and the likes. The defining code entries may define and/or manipulate one or more of the shared data items, for example, read, fetch and/or retrieve one or more shared data items from the shared resource(s) and/or write, manipulate and/or setup a value for one or more of the shared data items in the shared resource(s). The dependencies describe the location(s) in the execution path in which the shared data item(s) are defined by the defining code entries with respect to the location(s) in the execution path at which code entries use the shared data item(s). An instance of the dependency record is created for each of the shared resources.

As shown at 103, a resource access point is identified based on the dependency record. A resource access point may be identified for each of the shared resources. The resource access point for each of the shared resources is located in the execution path of the target code where:

The resource access point precedes in the execution path at least some code entries which use the one or more shared data items from the shared resource.

The resource access point follows in the execution path the defining code entries which define the one or more shared data items in the shared resource.

As shown at 104, the target code is refactored to group one or more of the code entries which use the shared data item(s) together and place them at a location which follows the resource access point without altering the execution path of the target code so that all accesses to the shared resource may be consolidated to a single access. The code entry(s) which use the shared data item(s) must be placed following the resource access point to verify the shared data item(s) are available (defined) by the defining code entry(s) prior to execution of any of the code entries which use the shared data item(s). One or more of the defining code entry(s) may be grouped together at a point in the target code which precedes the resource access point without altering the execution path of the target code in order to consolidate their accesses to the shared resource. Consolidating the access to each of the shared resource(s) may significantly reduce the performance penalty involved with each of the accesses to the shared resource(s). The refactored code is identical to the target code with respect to functional and/or operational characteristics and/or behavior. The refactoring may involve modification to the execution path and/or order but not to the execution behavior, function, input and/or output products.

As shown at 105, the refactored coded is outputted to the one or more users using the UI.

Optionally, additional one or more resource access points may be identified for each of the shared resources where each resource access point may relate to a segment of the execution path of the target code.

Optionally, the dependency record is enhanced by analyzing usage analytics of the target code which may be collected from a plurality of users using the target code. For example, in case analyzing the usage analytics reveals that several accessing code entries use one or more data items from a certain one of the shared resources, for example, a remote server and/or a webpage, the accessing code entries may be grouped together to consolidate their accesses to the certain shared resource.

Refactoring the target code may be expressed as follows. For a given target code P which includes S code entries that access the remote resource(s) the dependency record is created to describe the dependencies and/or relationships among the plurality of code entries with respect to the one or more shared data items available in the shared resource(s). A resource access point L is identified based on the dependency record where the resource access point L precedes a subset S' of S in the execution path of the target code where the code entries of the subset S' use the one or more shared data item(s). The resource access point L follows defining code entries which define the shared data item(s) used by the code entries of the subset S'. One or more code entries of the subset S' may be extracted from their location and grouped together at a point in the target code execution code which precedes the resource access point L in order to consolidate their access to the shared resource without altering the execution path of the target code.

Optionally, one or more of the defining code entries which define the shared data item(s) used by the code entries of the subset S' may be grouped together at a point in the target code execution code which precedes the resource access point L in order to consolidated their access to the shared resource.

Optionally, additional one or more code entry subsets such as the subset S' are identified within the target code P where each subset S' includes code entries of a different code segment of the target code P.

Figure 2:
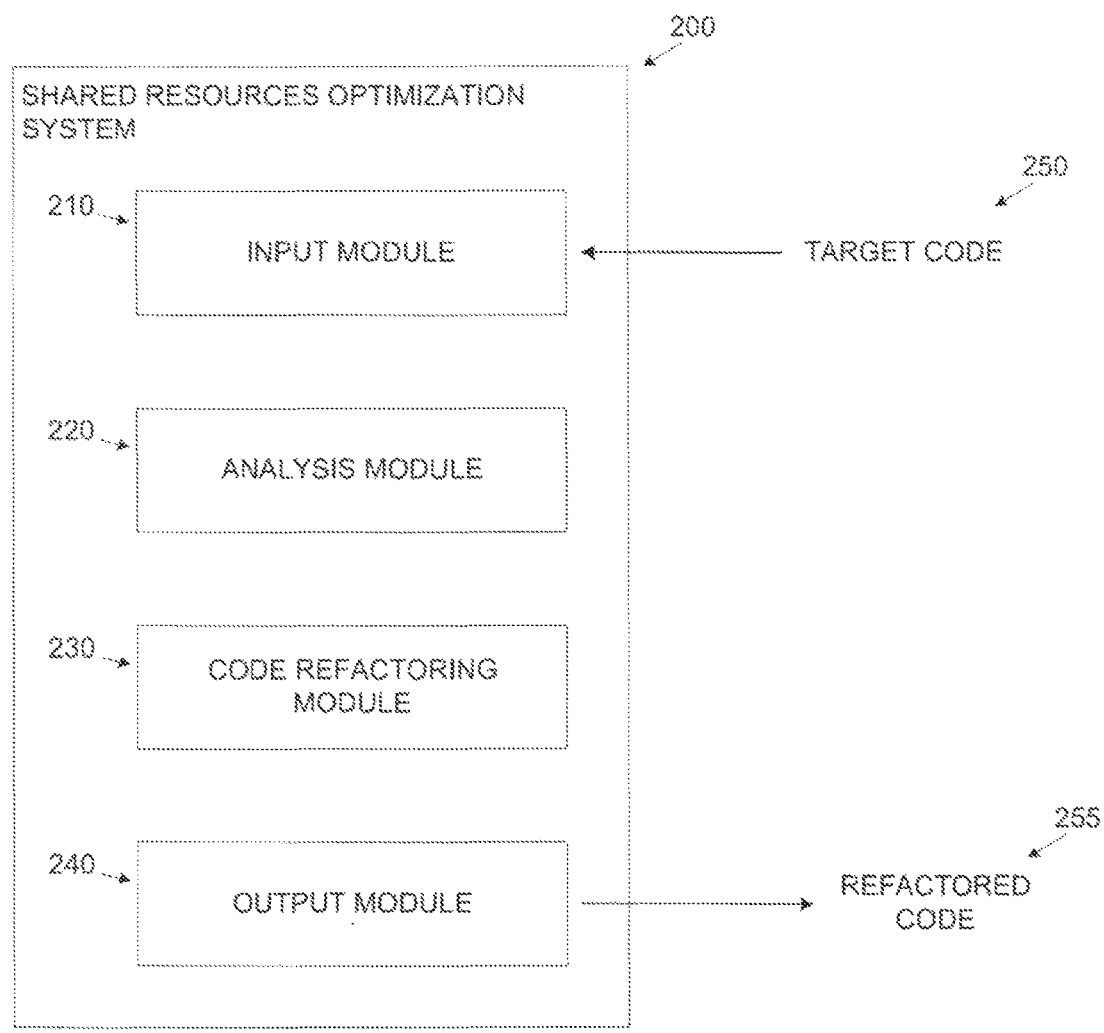
FIG. 2 is a schematic illustration of an exemplary system for refactoring target code to optimize accesses to shared resource(s), according to some embodiments of the present invention.

Reference is now made to FIG. 2 which is a schematic illustration of an exemplary system for refactoring target code to optimize accesses to shared resource(s), according to some embodiments of the present invention. A code refactoring system 200 includes an input module 210 which receives a target code 250, an analysis module 220, a code refactoring 230 and an output module 240 for outputting a refactored code 255. Wherein a module refers to a plurality of program instructions stored in a non-transitory medium and executed by a processor. The system 200 performs a code refactoring process such as the refactoring process 100 for one or more shared resources shared among a plurality of code entries of the target code 250.

The input module 210 receives the target code 250 which comprises the plurality of code entries. The input module 210 may consist of a UI for interacting with one or more users (programmers) to retrieve the target code 250 from, for example, a non-transitory medium integrated in system 200, a portable storage device and the likes. Optionally, the input module 210 includes a communication link to communicate with one or more remote servers to receive the target code 250 from a remote location. The UI may be implemented through a plurality of human-machine interfaces, for example, text interface, GUI and/or audio interface. The GUI may present one or more users a visual input/output (I/O) interface displayed on a screen coupled with input devices, such as, keyboard, pointing device, audio input through a microphone and the likes. The GUI may be part of a development environment, for example, an IDE and the likes which may be include a code refactoring software tool for refactoring the target code 250. The code refactoring software tool may be integrated in the IDE, added as an add-on module and/or executed as a standalone application. Optionally, the IDE may be available to the one or more users from a remote location, for example, SAAS, a cloud service, a web browser session and/or an application instance executed locally from a remote server.

The analysis module 220 analyzes the execution path of the target code 250 and creates a dependency record. The analysis may be done using, for example, a static analysis to create a dependency graph. The dependency record maps dependencies and/or relationships among the plurality of code entries with respect to one or more shared data items, for example, variables, data and/or objects form a shared resource(s) such as, a memory address, a storage address, a network address, a GPU address, a SIMD processor address, a remote resource available over the network and the likes. The dependency record describes the location(s) in the execution path in which the shared data item(s) are defined by defining code entries with respect to the location(s) in the execution path at which code entries use the shared data item(s). An instance of the dependency record may be created for each of the shared resources. The analysis module 220 identifies a resource access point based on the dependency record. The resource access point may be identified for each of the shared resource(s). The resource access point is selected at a point in the execution path of the target code where the resource access point precedes at least some code entries which use the shared data items and the resource access point follows the defining code entries.

The code refactor module 230 refactors the target code 250 in order to optimize execution performance of the target code 250 with respect to accesses to the one or more shared resources. One or more defining code entries are group together and placed at a location which precedes the resource access point so as to make sure that all shared data item(s) used by the code entries which follow the resource access point are available before execution of any of the following code entries which use the shared data item(s).

The output module 240 output the refactored code 250. The output module 240 may be integrated with the input module 210, for example, integrated in the UI.

Figure 3:
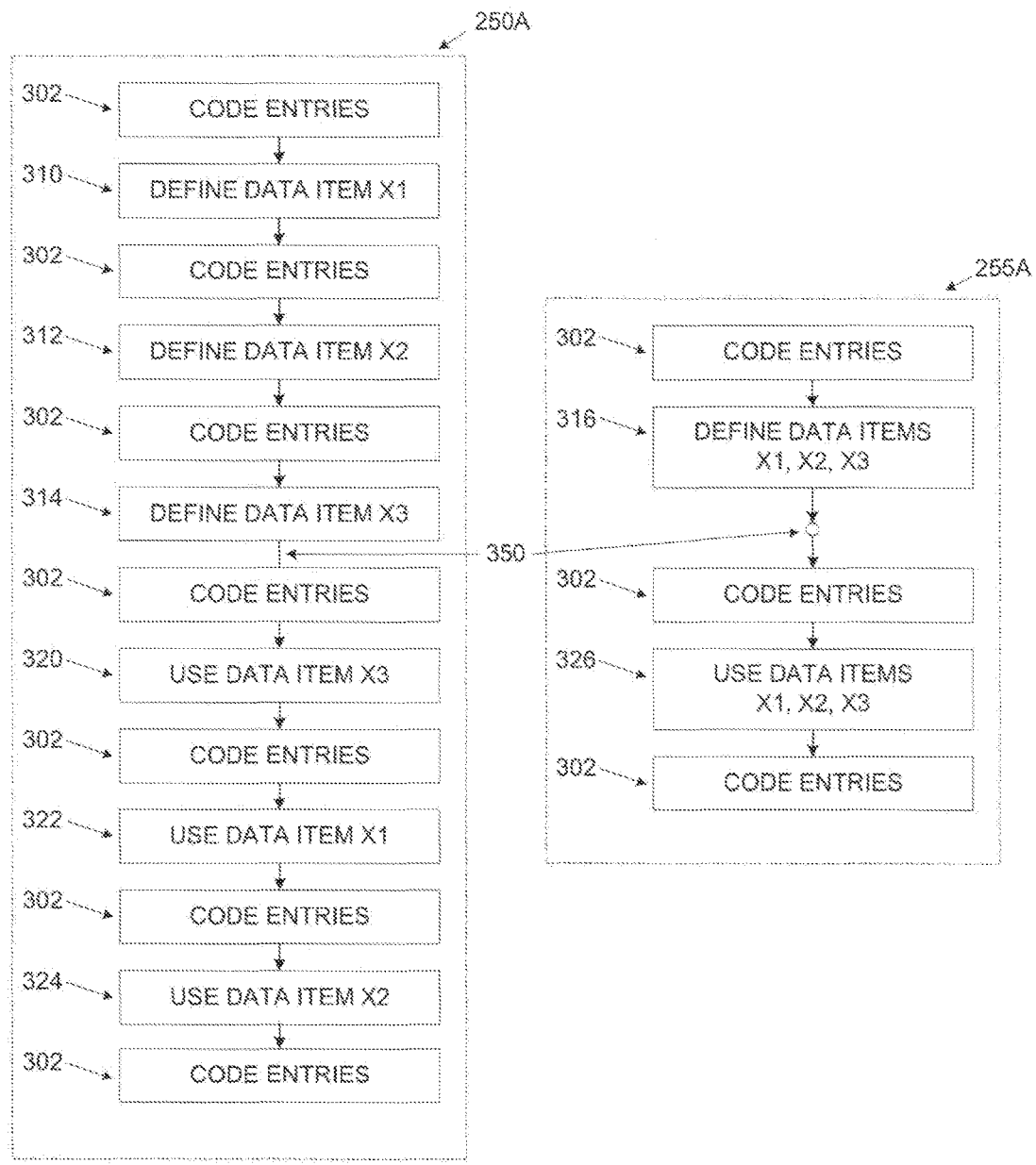
FIG. 3 is a schematic illustration of refactoring an exemplary target code representation, according to some embodiments of the present invention.

Reference is now made to FIG. 3 which is a schematic illustration of refactoring an exemplary target code representation, according to some embodiments of the present invention. A target code 250A such as the target code 250 includes a plurality of code entries 302 which do not use and/or define shared data items, a code entry 310 which defines a shared data item X1, a code entry 312 which defines a shared data item X2, a code entry 314 which defines a shared data item X3, a code entry 320 which uses the shared data item X3, a code entry 322 which uses the shared data item X1 and a code entry 324 which uses the shared data item X2. The target code 250A is a high level representation only for the purpose of demonstrating the process and is not limiting in any way. The target code 250A may be provided in the form of, code, AST, code abstraction, code XML representation, JavaScript code, C code, C++ code, C# code, Objective C code, swift code, Java android code and/or any software code abstraction and/or representation technique. The shared data items X1, X2 and X3 are all available from a common shared resource, for example, a network, a database, a storage, a memory, a processing node and/or a remote resource available over the network, for example, a database, a storage, a memory and/or a processing node. A code refactoring process such as the code refactoring process 100 receives the target code 250A and creates using a dependency record for the common shared resource from which the shared data items X1, X2 and X3 are available. The dependency record may be, for example, a dependency graph created using a static analysis. The analysis performed by the process 100 identifies a resource access point 350 which follows in an execution path of the target code 250A the defining code entries 310, 312 and 314 which define the shared data items X1, X2 and X3 respectively. The resource access point 350 precedes the code entries 320, 322 and 324 which sue the shared data items X1, X2 and X3. The code refactoring process 100 may then refactor the code to generate a refactored code 255A such as the refactored code 255 in which the code entries 320, 322 and/or 324 may be extracted from their original location in the target code 250A and grouped together at code entry 326 which follows the resource access point 350 without altering the execution path of the target code 250A. Grouping together the code entries 320, 322 and/or 324 may allow consolidating their access to the shared resource to reduce the performance penalty involved with accessing the shared resource, for example, long access time, extended session time, extended setup time, extended teardown time and/or high processing load.

Optionally, one or more of the code entries 310, 312 and 314 are grouped together at code entry 316 which precedes the resource access point 350 in order to consolidate the accesses of code entries 310, 312 and 314 to the shared resource to a single access.

Optionally, additional one or more resource access points such as the resource access point 350 are identified based on said dependency record where each of the additional resource access points may relate to a different segment of the execution path of the target code 250A.

Optionally, the dependency record is enhanced by analyzing usage analytics of the target code which may be collected from a plurality of users using the target code. For example, in case analyzing the usage analytics reveals that several accessing code entries use one or more data items from a certain one of the shared resources, for example, a remote server and/or a webpage, the accessing code entries may be grouped together to consolidate their accesses to the certain shared resource.

Figure 4:
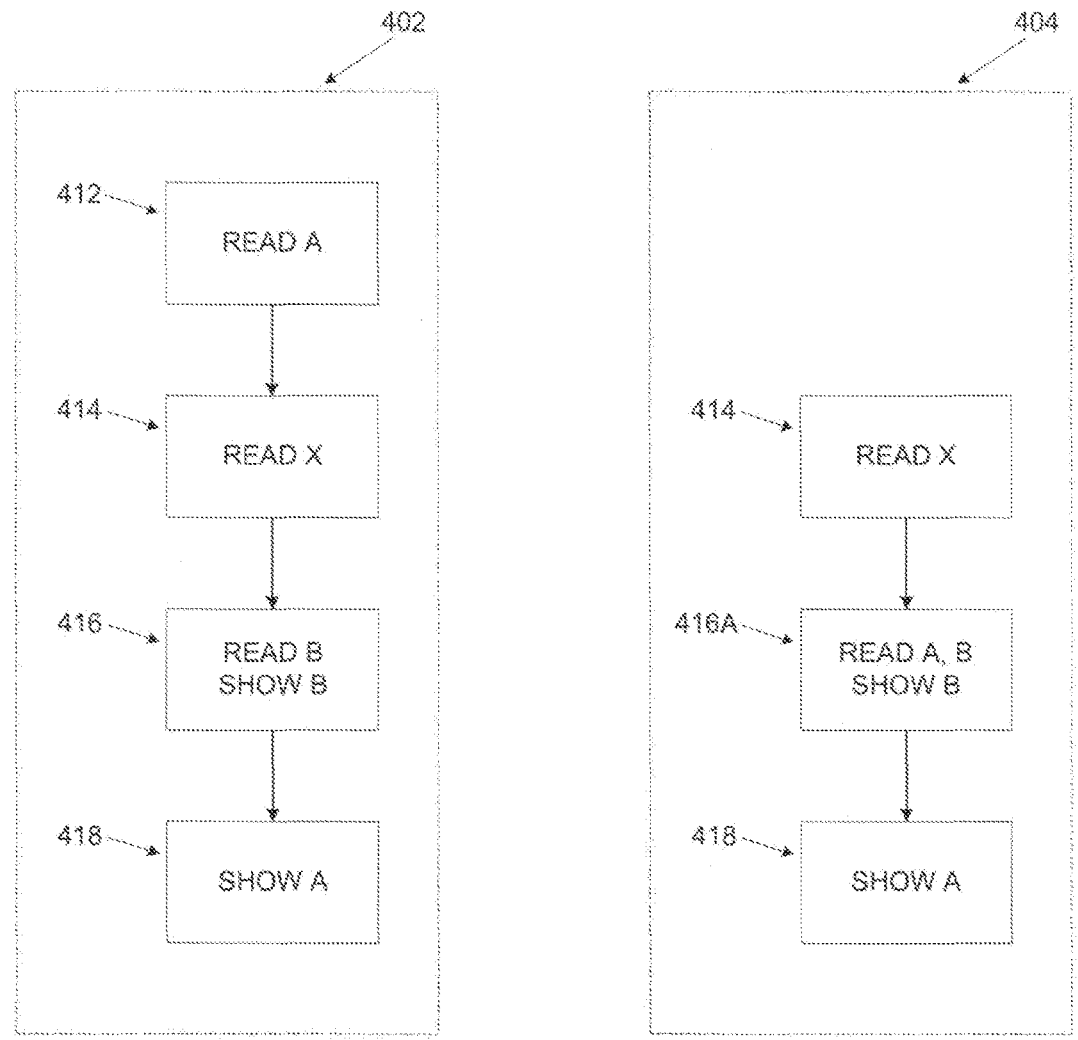
FIG. 4 is a schematic illustration of refactoring an exemplary target code representation of a mobile application accessing a network resource, according to some embodiments of the present invention.

Reference is now made to FIG. 4 which is a schematic illustration of refactoring an exemplary target code representation of a mobile application accessing a network resource, according to some embodiments of the present invention. A mobile application target code 402 such as the target code 250 is received by a system for code refactoring such as the system 200 executing a code refactoring process such as the process 100. The mobile application target code 402 includes a code entry 412 which reads (in the context of defines) a shared data item A, a code entry 414 which reads (in the context of defines) a shared data item X, a code entry 416 which reads (in the context of defines) a shared data item B and displays (in the context of uses) the shared data item B and a code entry 418 which displays (in the context of uses) the shared data item A. The read operation of shared data items A and B may be, for example, retrieving the shared data item A and B from a shared resource available over a network, for example, a remote server and/or web page. The show operation may be, for example, presenting the shared data item A and B on a display, for example, a screen of a mobile phone and/or a webpage. A code refactoring process such as the code refactoring process 100 is executed over the mobile application target code 402 and to create a dependency record for the shared resource holding the shared data items A and B. Based on the dependency record the code refactoring process 100 identifies a resource access point for the shared resource located prior to code entry 416. The code refactoring process 100 may group the code entries 412 and 416 to create a mobile application refactored code 404 such as the refactored code 255 in which the code entry 416 is modified to 416A. The code entry 416A now includes a single access to the shared resource for retrieving both the shared data item A and the shared data item B at once. The data item X is not shared by more than one code entry in the mobile application target code 402 and is therefore not affected by the code refactoring process 100. The operational characteristics of the mobile application 402 is not altered in any way following the code refactoring process 100 while the shared resource is accessed once instead of twice thus optimizing the execution performance of the mobile application refactored code 404 since the performance penalty is avoided for one instance of accessing the shared resource (one access is performed instead of two).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of refactoring software code to optimize execution performance by consolidating shared resources accesses, comprising:
using at least one hardware processor for performing the following:
receiving a target code containing a plurality of code entries comprising instructions to access at least one of a plurality of shared resources, said at least one shared resource is a member of a group consisting of: a memory resource address, a storage resource address, a communication resource address and a processing resource address, wherein said at least one shared resource is local or remote;
automatically creating a dependency graph for each of said at least one shared resource by analyzing said target code using a static code analysis, said dependency graph describes dependencies among at least some of said plurality of code entries accessing at least one shared data items in said at least one shared resource;
identifying, based on said dependency graph, a resource access point for each of said at least one shared resource, said resource access point is located in an execution path of said target code to precede execution of at least some of said plurality of code entries which use said at least one shared data item and said resource access point follows execution of defining code entries of said plurality of code entries which define said at least one shared data item;
automatically refactoring said target code to group together said at least some code entries which use said at least one shared data item, said group is placed following said resource access point to consolidate shared resource accesses of said at least some code entries to said at least one shared resource; and
outputting said refactored target code.

2. The computer implemented method of claim 1, wherein said refactoring does not alter any functional characteristics of said target code.

3. The computer implemented method of claim 1, wherein said definition performed by said defining code entries is a member selected from a group consisting of: manipulating said at least one shared data item in said at least one shared resource, setting said at least one shared data item in said at least one shared resource and retrieving said at least one shared data item from said at least one shared resource.

4. The computer implemented method of claim 1, further comprising consolidating shared resource accesses for at least some of said defining code entries, said consolidated access is executed prior to said resource access point in said execution path.

5. The computer implemented method of claim 1, further comprising refactoring said target code to include at least one additional resource access point for said at least one shared resource to consolidate accesses to said at least one shared resource for at least one additional segment of said target code.

6. The computer implemented method of claim 1, further comprising said dependency graph is enhanced by analyzing usage analytics of said target code, said usage analytics is collected from a plurality of users using said target code.

7. The computer implemented method of claim 1, further comprising said fourth program instructions refactors said target code to include at least one additional resource access point for said at least one shared resource to consolidate accesses to said at least one shared resource for at least one additional segment of said target code.

8. A system for refactoring software code to optimize execution performance by consolidating shared resources accesses, comprising:
an interface for communicating with a user;
a program store storing a code; and
at least one processor coupled to said interface and said program store for executing the stored code, the code comprising:
code instructions to receive a target code containing a plurality of code entries comprising instructions to access at least one of a plurality of shared resources, said at least one shared resource is a member of a group consisting of: a memory resource address, a storage resource address, a communication resource address and a processing resource address, wherein said at least one shared resource is local or remote;
code instructions to create a dependency graph for each of said at least one shared resource by analyzing said target code using a static code analysis, said dependency graph describes dependencies among at least some of said plurality of code entries accessing at least one shared data item in said at least one shared resource;
code instructions to identify, based on said dependency graph, a resource access point for each of said at least one shared resource, said resource access point is located in an execution path of said target code to precede execution of at least some code entries of said plurality of code entries which use said at least one shared data item and said resource access point follows execution of defining code entries of said plurality of code entries which define said at least one shared data item;
code instructions to refactor said target code to group together said at least some code entries which use said at least one shared data item, said group is placed following said resource access point to consolidate shared resource accesses of said at least some code entries to said at least one shared resource; and
code instructions to output said refactored target code.

9. The system of claim 8, wherein said refactoring does not alter any functional characteristics of said target code.

10. The system of claim 8, further comprising said at least one processor is adapted for executing the following code instructions in said code stored:
code instructions to consolidate shared resource accesses for at least some of said defining code entries, said consolidated access is executed prior to said resource access point in said execution path.

11. A computer program product for refactoring software code to optimize execution performance by consolidating shared resources accesses, comprising:
a non-transitory computer readable storage medium;
first program instructions to receive a target code containing a plurality of code entries comprising instructions to access at least one of a plurality of shared resources, said at least one shared resource is a member of a group consisting of: a memory resource address, a storage resource address, a communication resource address and a processing resource address, wherein said at least one shared resource is local or remote;
second program instructions to create a dependency graph for each of said at least one shared resource by analyzing said target code using a static code analysis, said dependency graph describes dependencies among at least some of said plurality of code entries accessing at least one shared data item in said at least one shared resource;
third program instructions to identify based on said dependency graph, a resource access point for each of said at least one shared resource, said resource access point is located in an execution path of said target code to precede execution of at least some code entries of said plurality of code entries which use said at least one shared data item and said resource access point follows execution of defining code entries of said plurality of code entries which define said at least one shared data item;
fourth program instructions to refactor said target code to group together said at least some code entries which use said at least one shared data item, said group is placed following said resource access point to consolidate shared resource accesses of said at least some code entries to said at least one shared resource; and
fifth program instructions to output said refactored target code;
wherein said first, second, third, fourth and fifth program instructions are executed by at least one processor from said non-transitory computer readable storage medium.

12. The computer program product of claim 11, wherein said refactoring does not alter any functional characteristics of said target code.

13. The computer program product of claim 11, wherein said definition performed by said defining code entries is a member selected from a group consisting of: setting said at least one shared data item in said at least one shared resource and retrieving said at least one shared data item from said at least one shared resource.

14. The computer program product of claim 11, further comprising a sixth program instructions to consolidate shared resource accesses for at least some of said defining code entries, said consolidated access is executed prior to said resource access point in said execution path;
 wherein said sixth program instructions are executed by said at least one processor from said non-transitory computer readable storage medium.

15. The computer program product of claim 11, further comprising said computer program product is a member selected from a group consisting of: an integrated development environment (IDE), an add-on to the IDE, a service as a software (SAAS), a cloud service and a tool available through a session with a remote server.

16. The computer program product of claim 11, further comprising said dependency graph is enhanced by analyzing usage analytics of said target code, said usage analytics is collected from a plurality of users using said target code.

* * * * *